United States Patent [19]

MacLauchlan et al.

[11] Patent Number: 5,526,213

[45] Date of Patent: Jun. 11, 1996

[54] GROUND FAULT PROTECTION FOR EMAT TRANSISTOR SWITCHED MAGNET PULSERS

[75] Inventors: Daniel T. MacLauchlan; Karl C. Henderson, both of Lynchburg, Va.

[73] Assignee: The Babcock & Wilcox Company, New Orleans, La.

[21] Appl. No.: 285,245

[22] Filed: Aug. 3, 1994

[51] Int. Cl.⁶ ........................................ H02H 3/26
[52] U.S. Cl. ........................................ 361/45; 361/87
[58] Field of Search ........................ 361/42–49, 79, 361/86–87, 93

[56] References Cited

U.S. PATENT DOCUMENTS 4,955,069  9/1990  Ionescu .............................. 388/811

5,224,006  6/1993  MacKenzie et al. .................. 361/45

*Primary Examiner*—Jeffrey A. Gaffin
*Assistant Examiner*—Michael J. Sherry
*Attorney, Agent, or Firm*—Robert J. Edwards; Eric Marich

[57] ABSTRACT

A fast reacting ground fault interrupter circuit particularly suited for use with high current, high voltage DC pulses generated by transistor switched magnet pulsers driving pulsed electromagnets used with electromagnetic acoustic transducers (EMATs). Whenever a ground fault is detected, a digital shut off signal is sent to the transistor switched magnet pulser to shut it off and prevent transmission of the DC pulse. Additionally, the shut off signal is also provided to a DC current interrupter which shuts off power supplied to the transistor switched magnet pulser itself.

9 Claims, 2 Drawing Sheets

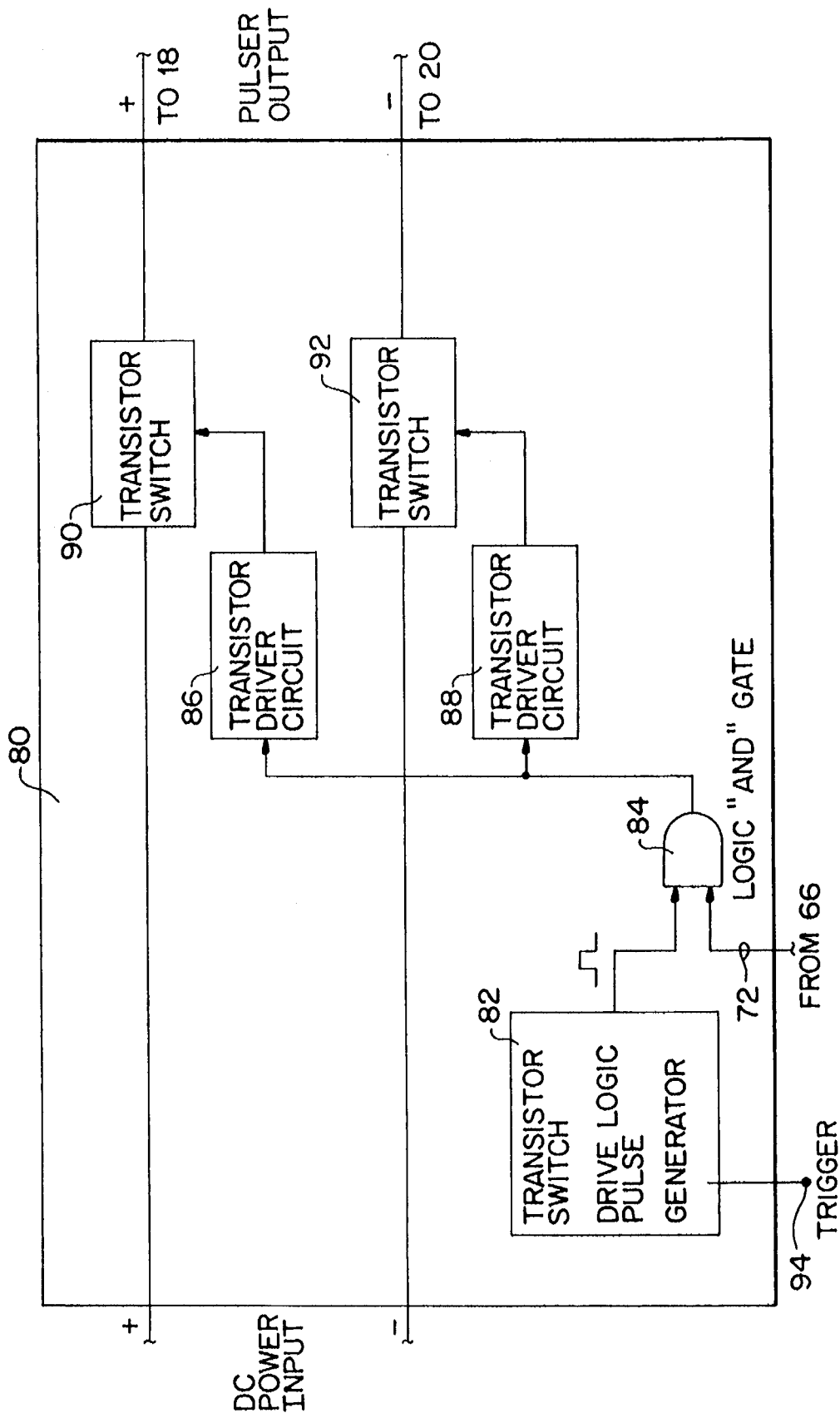

1

GROUND FAULT PROTECTION FOR EMAT TRANSISTOR SWITCHED MAGNET PULSERS

FIELD AND BACKGROUND OF THE INVENTION

The present invention relates, in general, to electromagnetic acoustic transducers and inspection systems utilizing same and, in particular, to a new and useful fast reacting ground fault interrupter for use with high current pulsers for driving electromagnets used with electromagnetic acoustic transducers (EMATs).

Ground fault interrupter (GFI) circuits are commonly available (and for certain circuits in household wiring are required) protection circuits for standard power distribution applications. Generally these devices sense the difference between the current flowing in the high side (supply side) and low side (return) of a circuit, with the low side of the circuit connected to safety ground only at the power source. Normally, the current in the high side of the circuit equals the current in the low side of the circuit so that the difference is zero. When a short or leakage path develops between the circuit and safety ground, some of the circuit current flows through the safety ground to return to the low side of the power source, causing the current in the high side and low side of the circuit to become unequal. The ground fault interrupter (GFI) senses this difference in currents and shuts off the circuit. The devices that are known to the inventors operate with either AC (alternating current) or DC (direct current) power circuits.

EMATs are the basis of a noncontact ultrasonic inspection method that requires no fluid couplant because the sound is produced by an electromagnetic interaction within the material. The Babcock & Wilcox Company has developed a high current, transistor switched magnet pulser circuit for use with EMATs. This pulser circuit, in conjunction with a pulsed electromagnet, produces the magnetic field necessary for the operation of EMATs in many applications. The pulser circuit is capable of producing 200 amp pulses at supply voltages of up to 300 V DC. In operation, the pulser circuit connects a DC power source to the terminals of the pulsed magnet using transistor switches. Current ramps up in the pulsed magnet, limited by the resistance and inductance of the pulsed magnet. After a sufficient amount of time (typically several hundred microseconds) the current and therefore the magnetic field reach a level required for the operation of the EMAT. At this time an ultrasonic signal is launched and then received by the EMAT. The transistor switches are then turned off, shutting off the current flow into the pulsed magnet. By using this pulsed operation large magnetic fields are produced with a much smaller electromagnet and much less power dissipation than a DC electromagnet. Typical rising current pulse lengths are 0.1 to 5 milliseconds.

Transistor switched magnet pulsers frequently produce high-voltage and/or high-current pulses. The high voltages and high currents can present personnel safety hazards to people in contact with the magnets or associated structures in the event of a fault in the magnet coil insulation or magnet cable insulation. In addition, high fault currents may result in damage to the transistor switched magnet pulser circuit itself, or the component being tested if the component is grounded and is in contact with the pulsed magnet or supporting structure.

Accordingly, it has become desirable to provide a ground fault protection circuit for operation with EMAT transistor switched magnet pulsers to quickly shut off the transistor switched magnet pulser when a ground fault in the pulsed magnet or connecting cable is detected.

SUMMARY OF THE INVENTION

The present invention is drawn to a fast reacting ground fault interrupter circuit for use with high current pulsers for driving pulsed electromagnets used with Electromagnetic Acoustic Transducers (EMATs).

This circuit is capable of operation with the pulsed currents generated by the transistor switched magnet pulser and is able to shut off the transistor switched magnet pulser in only a few microseconds.

Accordingly, one aspect of the present invention is drawn to an electrical circuit for use with transistor switched magnet pulsers driving pulsed electromagnets used with electromagnetic acoustic transducers, having a fast reacting, ground fault interrupter that is capable of operation with high current, high voltage DC pulses generated by the transistor switched magnet pulser and which shuts off the transistor switched magnet pulser in only a few microseconds when a ground fault is detected in the pulsed electromagnet or electrical cable means connected thereto. Transistor switched magnet pulser means are provided to produce a high current, high voltage, DC pulse. Pulsed electromagnet means receive the DC pulse via electrical cable means connected inbetween the transistor switched magnet pulser means and the pulsed electromagnet means. Ground fault interrupter circuit means are provided for shutting off the transistor switched magnet pulser means within a few microseconds to prevent transmission of the DC pulse to the pulsed electromagnet means whenever a ground fault is detected.

Another aspect of the present invention is drawn to an electrical circuit having a transistor switched pulsed current source for producing high current, high voltage pulses and electrical cable means having a first and a second conductor for conveying the pulses inbetween the transistor switched pulsed current source and a load, a fast reacting, ground fault interrupter which shuts off the pulsed current source in only a few microseconds and prevents transmission of the pulses when a ground fault is detected in the electrical cable means. The ground fault interrupter comprises current transformer probe means operatively associated with said electrical cable means. The probe means senses a difference in current flowing through the two conductors to produce a ground fault signal proportional to said difference at an output of said probe means whenever current in one of said conductors is different from that in the other conductor. Means are provided for supplying said ground fault signal to first comparator means for comparing said ground fault signal against a first reference voltage to produce a first output signal indicative of said comparison. The ground fault signal is also supplied to unity gain inverting circuit means for producing an inverted ground fault signal. Second comparator means, operatively connected to said unity gain inverting circuit means, are provided for comparing said inverted ground fault signal against said first reference voltage to produce a second output signal indicative of said comparison. The first and second output signals from said comparators are provided to flip-flop means, responsive to said output signals, for providing a shut off signal to the transistor switched pulsed current source to prevent transmission of the pulse whenever the ground fault is detected.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 2 is a schematic representation of the pulser circuitry shown in FIG. 1.

DESCRIPTION OF THE PREFERRED EMBODIMENTS

Figure 1:
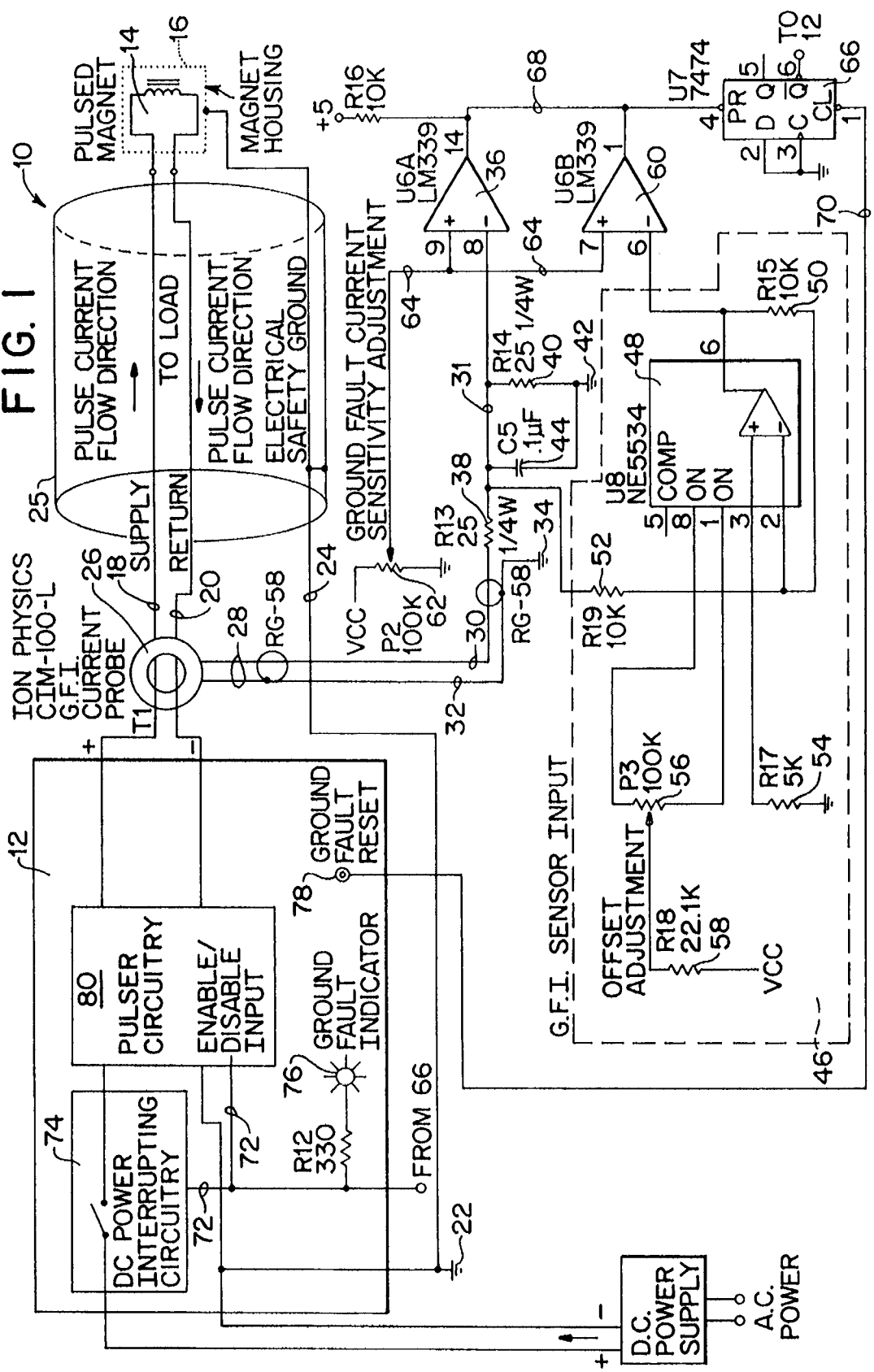
FIG. 1 is a schematic representation of an electrical circuit incorporating the fast reacting ground fault interrupter circuit of the present invention.

Referring to the drawings generally, wherein like numerals represent the same or functionally similar elements throughout the several drawings, and to FIG. 1 in particular, there is shown an electrical circuit, generally designated 10, incorporating the fast reacting ground fault interrupter circuit of the present invention that has been developed and tested. Pulsed DC current from a pulsed current supply device or transistor switched magnet pulser 12 is supplied to a pulsed electromagnet or pulsed magnet 14 contained within magnet housing 16 via line 18 labeled SUPPLY. The pulsed DC current returns from the pulsed magnet 14 via line 20 labeled RETURN, which is grounded to electrical safety ground 22 at the pulsed current supply device 12. The magnet housing 16 is also grounded to ground 22 via line 24. In practice, the preferred cable for connecting the transistor switched magnet pulser 12 to the pulsed magnet 14 surrounds lines 18 and 20, as well as ground line 24, within a single, conductive braid shield 25 which is also connected to electrical safety ground 24 to provide RFI shielding and additional personnel protection. Of course, an outer layer of insulation (not shown) surrounds the conductive braid shield 25. Lines 18 and 20 are routed through a current transformer probe 26. Probe 26 is preferably a torodial current transformer probe which senses the current flowing through the center of the toroidal coil of the probe 26. A preferred model of same is made by ION PHYSICS, a Model No. CIM-100-L GFI current probe.

In normal operation, the magnitude of the pulsed current flowing in the RETURN line 20 equals the magnitude of the current flowing in the SUPPLY line 18, but flows in an opposite direction. The net current flowing through the center of torodial current transformer 26 is therefore zero, and no signal is present at an output 28 of torodial current transformer 26. If the insulation breaks down on the coil of the pulsed magnet 14 or in the lines 18, 20, some of the pulsed current returns to the pulsed current supply device 12 via the safety ground 24 instead of via the RETURN line 20. This results in the RETURN line 20 current being different than the SUPPLY line 18 current. Torodial current transformer 26 senses this difference in currents and produces a ground fault signal at its output 28 proportional to the difference in the SUPPLY line 18 and RETURN line 20 currents. The ground fault signal from the torodial current transformer 26 is output over lines 30 and 32, schematically shown as two lines but which could take the form of a conventional RG-58 coaxial cable. Line 32 is connected to ground 34. Line 31 applies the torodial current transformer 26 ground fault signal to a negative input of comparator 36, pin 8, via a resistor 38 typically rated at ¼ watt. A resistor 40 connected inbetween line 31 and ground 42 provides a low impedance load for the input to the comparator 36 (and others described, infra) and in conjunction with resistor 38, provides a 50 ohm termination for the torodial current transformer probe 26. Capacitor 44, connected inbetween line 31 and ground 42, acts as a filter for reducing high frequency noise pulses. The ground fault signal from current probe 26 is also conducted from line 31 to an input of a unity gain inverting amplifier circuit 46 comprised of the combination of a low noise op-amp 48, such as a Texas Instruments Model No. NE5534, or equivalent and resistors 50, 52, and 54. This circuit 46 simply inverts the ground fault signal from the current probe 26, and also includes variable potentiometer 56 and resistor 58 which allow the DC offset of the unity gain inverting amplifier circuit 46 to be set to zero, using reference voltage VCC. Comparators 36 and 60 are provided to compare the ground fault signal from current probe 26 and the inverted ground fault signal from inverting amplifier circuit 46 to a reference voltage VCC set by adjusting variable potentiometer 62. The reference voltage VCC is applied via potentiometer 62 via line 64 to the positive input, pin 9, of comparator 36, and to the positive input, pin 7, of comparator 60. The inverted ground fault signal from inverting amplifier circuit 46 is applied to the negative input, pin 6, of comparator 60. Comparators 36 and 60 are advantageously a National Semiconductor Model No. LM339, or equivalent.

If the current probe 26 ground fault signal present at pin 8 of comparator 36 exceeds the reference voltage provided on pin 9, the output signal at pin 14 of comparator 36, which is normally high (at approximately 5 volts), immediately goes low (to approximately 0.5 volts). Likewise if the inverted ground fault signal provided on pin 6 of comparator 60 ever exceeds the reference voltage on pin 7 thereof, the output signal at pin 1 immediately goes low. In this manner, either a positive going or negative going ground fault signal from the current probe 26 is immediately detected. If either output signal, from pin 14 of comparator 36 or pin 1 of comparator 60 goes low, flip-flop 66, connected thereto via line 68, is preset to cause the output at pin 6 thereof to go low, representing a shut off signal. This output at pin 6 remains low until a low going reset pulse is applied to the reset input provided via line 70 to pin 1 of flip-flop 66, provided that the ground fault has been corrected. Flip-flop 66 is advantageously a Texas Instruments Model No. SN7474, or equivalent.

When the output at pin 6 of flip-flop 66 goes low, representing a shut off signal, three things immediately occur. The shut off signal, via line 72: (1) shuts off driver circuits to the transistor switches in the magnet pulser 12 (see FIG. 2, infra) to shut off the current flow to the pulsed magnet 14; (2) activates DC power interrupting circuitry 74, such as a relay, thereby shutting off the DC power supply to the transistor switched magnet pulser 12; and (3) an LED (Light Emitting Diode) indicator 76 on a front panel of the transistor switched magnet pulser 12 is illuminated, indicating that a ground fault has been detected. The transistor switched magnet pulser 12 remains disabled until the ground fault is corrected, and then a reset switch 78 on the front panel thereof can be depressed, sending a reset pulse to the ground fault interrupter circuit means 46 via flip-flop 66.

Referring now to FIG. 2, there is shown a schematic representation of those portions of pulser circuitry 80 within the magnet pulser 12 necessary to successfully practice the ground fault protection aspects of the claimed invention. It will be appreciated by those skilled in the art that certain details of the pulser circuitry, involving various signal conditioning and other aspects involved in producing an appropriate DC pulse suited for use in EMAT inspection methods and not forming a part of the present invention, have been omitted herein for the sake of brevity and will not be discussed further unless necessary to elucidate the principles of the present invention.

FIG. 2 details how the transistor switched magnet pulser 12 is immediately shut off by the signal from pin 6 of flip-flop 66 (FIG. 1). The pulser circuitry 80 comprises, inter alia, the following elements. A transistor switch drive logic pulse generator 82 generates a logic pulse which allows the magnet pulser 12 to transmit a DC pulse to the pulsed magnet 14. The logic pulse from logic pulse generator 82 is applied to one input of a logic AND gate 84; the other input of gate 84 is provided with the signals from pin 6 of flip-flop 66 via line 72. The output of AND gate 84 is applied to a pair of transistor driver circuits 86 and 88, which in turn control a pair of transistor switches 90 and 92, respectively. To activate the transistor switched magnet pulser 12 during normal operation (no ground fault) a logic pulse is generated by the transistor switch drive logic pulse generator 82, by means of trigger means 94. This logic pulse from logic pulse generator 82 determines when the transistor switches 90 and 92 are to be switched to their conducting state. This logic pulse is applied to the transistor drive circuits 86 and 88 via the logic AND gate 84. When no ground fault has been detected, the logic signal from flip-flop 66 is high, allowing the output of AND gate 84 to go high when the output from logic pulse generator 82 is high. The high output from AND gate 84 is applied to the inputs of transistor driver circuits 86 and 88. The transistor driver circuits 86 and 88 then provide the proper voltages and currents to the inputs of transistor switches 90 and 92 to cause the transistor switches 90 and 92 to go into their conducting states, allowing DC current to flow therethrough to lines 18 and 20 and then on to the pulsed magnet 14 (FIG. 1). When the output from the logic pulse generator 82 goes low, the output of AND gate 84 goes low, causing the transistor driver circuits 86 and 88 to turn off their respectively controlled transistor switches 90 and 92, immediately shutting off the DC current flowing therethrough to the pulsed magnet 14 (FIG. 1). If at any time the output from pin 6 of flip-flop 66 (FIG. 1) goes low (ground fault detected), the output from AND gate 84 goes low causing transistor driver circuits 86 and 88 to drive their respectively controlled transistor switches 90 and 92 to go into their nonconducting states, shutting off the DC current flowing therethrough to the pulsed magnet 14 (FIG. 1). This turn off time is typically only a few microseconds. As long as the signal from 66 is low, AND gate 84 is prevented from allowing the high going logic pulse from 82 from being applied to the transistor driver circuits 86 and 88, therefore preventing their respectively controlled transistor switches 90 and 92 from being switched into their conducting states.

While ground fault interrupter devices are commonly available for standard power distribution applications, to the present inventors' knowledge none are available that can deal with situations where the power source waveform can consist of arbitrary waveform pulses of extremely short duration (on the order of tens of microseconds), the typical operating mode in EMAT inspection systems. The ground fault detection circuit of the present invention is very fast acting, capable of shutting off the magnet pulser output transistor switches in a few microseconds, i.e. shutting off the current flow within an individual pulse, providing maximum protection to personnel, equipment, and components. To the present inventors' knowledge, existing ground fault interrupter devices are much slower reacting, requiring several milliseconds to shut off the power source, and are better suited or adapted to monitoring a continuous current having a defined average range.

While the ground fault detection circuit of the present invention is particularly suited for use in connection with EMAT inspection systems, it clearly has potential application in any high current output circuits. The ground fault detection circuit of the present invention is capable of operating with any waveform, including AC and DC currents, and would thus be useful in any critical applications where very fast reaction times (on the order of a few microseconds) are needed to disable the current output. This would include high power output linear amplifiers as well as other types of transistor switched pulsed current sources, and is applicable to various electrical circuits wherein such sources provide high current, high voltage pulses via electrical cable means having plural conductors for conveying the pulses to a load.

While specific embodiments of the invention have been shown and described in detail to illustrate the application of the principles of the invention, it will be understood that the invention may be embodied otherwise without departing from such principles. By way of example and not limitation, other current probes and/or transformers could be used for current transformer probe 26. Likewise, there are a wide range of op-amps, comparators, and flip-flops that could be substituted for comparators 36 and 60, flip-flop 66, and op-amp 48. Accordingly, all such embodiments have been deleted herein for the sake of conciseness and readability but properly fall within the scope of the following claims.

We claim:

1. An electrical circuit for use with transistor switched magnet pulsers driving pulsed electromagnets used with electromagnetic acoustic transducers, having a fast reacting, ground fault interrupter that is capable of operation with high current, high voltage DC pulses generated by the transistor switched magnet pulser and which shuts off the transistor switched magnet pulser in only a few microseconds when a ground fault is detected in the pulsed electromagnet or electrical cable means connected thereto, comprising:

transistor switched magnet pulser means for producing a high current, high voltage, DC pulse, the magnet pulser means including transistor switch drive logic pulse generator means electrically connected via a logic AND gate to transistor driver circuit means which control transistor switches associated therewith;

means for supplying power from an external power supply to the transistor switched magnet pulser means;

current interrupter means responsive to ground fault interrupter circuit means for shutting off power to the transistor switched magnet pulser means from the external power supply whenever a ground fault is detected;

pulsed electromagnet means for receiving the DC pulse;

electrical cable means for conveying the DC pulse inbetween the transistor switched magnet pulser means and the pulsed electromagnet means; and ground fault interrupter circuit means for providing a shut off signal to both the logic AND gate for shutting off the transistor switched magnet pulser means within a few microseconds to prevent transmission of the DC pulse to the pulsed electromagnet means, and to the circuit interrupter means for shutting off power to the transistor switched magnet pulser means, whenever a ground fault is detected in the electrical cable means or the pulsed electromagnet means.

2. The electrical circuit of claim 1, further comprising indicating means responsive to the ground fault interrupter circuit means for indicating when the ground fault has been detected.

3. The electrical circuit of claim 1, further comprising resetting means for resetting the ground fault interrupter circuit means once the ground fault has been corrected.

4. The electrical circuit of claim 1, wherein the electrical cable means comprises a supply line for providing the DC pulse from the transistor switched magnet pulser means to the pulsed electromagnet means and a return line for providing the DC pulse from the pulsed electromagnet means back to the transistor switched magnet pulser means; and wherein the ground fault interrupter circuit means includes current transformer probe means operatively associated with said supply and return lines for sensing a difference in current flowing therethrough to produce a ground fault signal proportional to said difference at an output of said probe means whenever current in the return line is different from that in the supply line.

5. The electrical circuit of claim 4, further comprising:

means for supplying said ground fault signal to first comparator means for comparing said ground fault signal against a first reference voltage to produce a first output signal indicative of said comparison; and means for supplying said ground fault signal to unity gain inverting circuit means for producing an inverted ground fault signal.

6. The electrical circuit of claim 5, further comprising second comparator means, operatively connected to said unity gain inverting circuit means, for comparing said inverted ground fault signal against said first reference voltage to produce a second output signal indicative of said comparison.

7. The electrical circuit of claim 6, further comprising first variable potentiometer means, connected to said first and second comparator means, for applying said first reference voltage thereto, the first reference voltage providing a ground fault current sensitivity adjustment capability to the ground fault interrupter circuit means.

8. The electrical circuit of claim 6, further comprising means for providing said first and second output signals from said comparators to flip-flop means, responsive to said output signals, for producing the shut off signal provided to both the transistor switched magnet pulser means to prevent transmission of the DC pulse to the pulsed electromagnet means, and to the current interrupter means for shutting off power to the transistor switched magnet pulser means, whenever the ground fault is detected.

9. In an electrical circuit having a transistor switched pulsed current source for producing high current, high voltage pulses and electrical cable means having a first and a second conductor for conveying the pulses inbetween the transistor switched pulsed current source and a load, a fast reacting, ground fault interrupter which shuts off the pulsed current source in only a few microseconds and prevents transmission of the pulses when a ground fault is detected in the electrical cable means, the ground fault interrupter comprising:

transistor switched pulsed current control source means for producing high current, high voltage pulses, the pulsed current source means including transistor switch drive logic pulse generator means electrically connected via a logic AND gate to transistor driver circuit means which control transistor switches associated therewith;

means for supplying power from an external power supply to the transistor switched pulsed current source means;

current interrupter means responsive to a shut off signal for shutting off power to the transistor switched pulsed current source means from the external power supply whenever a ground fault is detected;

current transformer probe means operatively associated with said electrical cable means for sensing a difference in current flowing through the two conductors to produce a ground fault signal proportional to said difference at an output of said probe means whenever current in one of said conductors is different from that in the other conductor;

means for supplying said ground fault signal to first comparator means for comparing said ground fault signal against a first reference voltage to produce a first output signal indicative of said comparison;

means for supplying said ground fault signal to unity gain inverting circuit means for producing an inverted ground fault signal;

second comparator means, operatively connected to said unity gain inverting circuit means, for comparing said inverted ground fault signal against said first reference voltage to produce a second output signal indicative of said comparison; and means for providing said first and second output signals from said comparators to flip-flop means, responsive to said output signals, for providing a shut off signal to both the transistor switched pulsed current source to prevent transmission of the pulse and to the current interrupter means for shutting off power to the transistor switched pulsed current source from the external power supply, whenever the ground fault is detected.

* * * * *